United States Patent [19]

Ginsberg

[11] Patent Number: 5,620,153
[45] Date of Patent: Apr. 15, 1997

[54] LIGHT AIRCRAFT WITH INFLATABLE PARACHUTE WING PROPELLED BY A DUCTED PROPELLER

[76] Inventor: Harold M. Ginsberg, 9727 Hagel Cir., Lorton, Va. 22079

[21] Appl. No.: 406,476

[22] Filed: Mar. 20, 1995

[51] Int. Cl.⁶ .................................................... B64C 3/38
[52] U.S. Cl. ............................ 244/13; 244/902; 244/903
[58] Field of Search .............................. 244/13, 16, 145, 244/900, 902, 903, 66, 69, 2, 6, 8, 152, 153 R, 65; 416/129

[56] References Cited

U.S. PATENT DOCUMENTS

| | | |
|---|---|---|
| Re. 28,454 | 6/1975 | Fitzpatrick et al. . |
| 984,812 | 2/1911 | Hearst ......................... 416/189 |
| 1,195,624 | 8/1916 | Tanner . |
| 1,454,967 | 5/1923 | Gill ............................. 416/189 |
| 1,473,744 | 11/1923 | Smith . |
| 1,630,336 | 5/1927 | Fox . |
| 1,774,404 | 8/1930 | Roescher . |
| 1,833,033 | 11/1931 | Ortega . |
| 1,836,928 | 12/1931 | Mego . |
| 1,860,087 | 5/1932 | Fehrenback . |
| 1,910,443 | 5/1933 | Mobley . |
| 2,088,802 | 8/1937 | McLaughlin ................. 416/189 |
| 2,366,795 | 1/1945 | Lamoreaux . |
| 2,379,355 | 6/1945 | Hodgdon . |
| 2,558,501 | 6/1951 | Turner . |
| 2,724,544 | 11/1955 | Hardigg . |
| 2,952,422 | 9/1960 | Fletcher . |
| 3,017,139 | 1/1962 | Binder . |
| 3,066,893 | 12/1962 | Mercier . |
| 3,078,938 | 2/1963 | Bollum . |
| 3,078,939 | 2/1963 | Bollum ........................ 180/116 |
| 3,138,349 | 6/1964 | Piasecki . |
| 3,285,546 | 11/1966 | Jalbert . |
| 3,372,893 | 3/1968 | Larsen et al. ................. 244/32 |
| 3,443,776 | 5/1969 | Moore . |
| 3,455,268 | 8/1969 | Gordon ......................... 114/166 |
| 3,486,729 | 12/1969 | Fitzpatrick et al. . |
| 3,606,570 | 9/1971 | Haggerty ..................... 416/189 |
| 3,749,337 | 7/1973 | Jalbert ......................... 244/145 |
| 3,907,218 | 9/1975 | Miller ........................... 244/5 |
| 3,913,871 | 10/1975 | Miller ........................... 244/5 |
| 3,944,169 | 3/1976 | Bede ............................ 244/16 |
| 3,968,944 | 7/1976 | Zimmer et al. ............ 244/1 N |
| 3,970,270 | 7/1976 | Pittet ............................ 244/5 |

(List continued on next page.)

FOREIGN PATENT DOCUMENTS

| | | |
|---|---|---|
| 2585668 | 2/1987 | France . |
| 4138995 | 5/1992 | Japan ............................. 244/900 |
| 991744 | 5/1965 | United Kingdom . |

OTHER PUBLICATIONS

Sport Pilot, Apr. 1995, vol. 11 No. 4, Schnepf, Edwin Publisher, "Goldy Solos!" pp. 16–18.

Dwiggins, Don, The Complete Book of Airships—Dirigibles, Blimps & Hot Air Balloons, TAB Books, Inc., Blue Ridge Summit, Pa. 17214 pp. 346–349.

Airships, "Ballooning as a Sport and in a Business" pp. 454–455.

Primary Examiner—Andres Kashnikow
Assistant Examiner—Tien Dinh
Attorney, Agent, or Firm—Robert Platt Bell & Associates, P.C.

[57] ABSTRACT

A para-plane (parachute or parafoil airplane), ultralight, or the like is provided with a ducted propeller or fan to increase efficiency of the powerplant, thus reducing the size of the powerplant required. In addition, the duct may reduce propeller and/or engine noise and enhance safety for pilot, passengers and bystanders. Axial vanes may be provided upstream or downstream of the propeller within the duct to counteract the torque effect of the propeller. In another embodiment, a novel inflatable parafoil may be provided to reduce the effort required to initially inflate a prior art parafoil and reduce the incidence of ground strikes of the parafoil. The inflatable parafoil may be inflated with a buoyant gas such as helium or hot air to further reduce ground contacts and provide limited buoyancy to the aircraft.

10 Claims, 17 Drawing Sheets

U.S. PATENT DOCUMENTS

| | | | |
|---|---|---|---|
| 3,993,268 | 11/1976 | Moore | 244/5 |
| 4,044,972 | 8/1977 | Anker-Holth | 244/12.2 |
| 4,102,519 | 7/1978 | Crosby, Jr. | 244/125 |
| 4,120,468 | 10/1978 | Fischer | 244/13 |
| 4,261,534 | 4/1981 | Roselli | 244/22 |
| 4,371,133 | 2/1983 | Edgley | 244/54 |
| 4,375,280 | 3/1983 | Nicolaides | 244/13 |
| 4,415,131 | 11/1983 | Bertelsen et al. | 244/13 |
| 4,424,945 | 1/1984 | Dell | 244/13 |
| 4,544,115 | 10/1985 | Edgley | 244/54 |
| 4,623,108 | 11/1986 | Musick | 244/13 |
| 4,657,207 | 4/1987 | Poling | 244/142 |
| 4,657,209 | 4/1987 | Edgley | 244/54 |
| 4,767,270 | 8/1988 | Seidel | 416/129 |
| 4,789,302 | 12/1988 | Gruzling | 415/213 |
| 4,836,748 | 6/1989 | Church | 416/181 |
| 4,860,970 | 8/1989 | Roselli | 244/16 |
| 4,865,275 | 9/1989 | Thompson | 244/219 |
| 4,875,642 | 10/1989 | Flynn | 244/13 |
| 4,930,724 | 6/1990 | Snyder | 244/13 |
| 4,934,630 | 6/1990 | Snyder | 244/13 |
| 5,005,783 | 4/1991 | Taylor | 244/97 |
| 5,039,031 | 8/1991 | Valverde | 244/12.2 |
| 5,044,576 | 9/1991 | Inada | 244/13 |
| 5,054,721 | 10/1991 | Bernholt | 244/903 |
| 5,078,335 | 1/1992 | David | 244/2 |
| 5,082,465 | 1/1992 | Wine | 440/37 |
| 5,096,013 | 3/1992 | Yoshida et al. | 180/117 |
| 5,096,382 | 3/1992 | Gratzer | 416/189 |
| 5,150,857 | 9/1992 | Moffitt et al. | 244/12.2 |
| 5,160,100 | 11/1992 | Snyder | 244/13 |
| 5,292,088 | 3/1994 | Lemont | 244/65 |
| 5,383,627 | 1/1995 | Bundo | 244/26 |

LIGHT AIRCRAFT WITH INFLATABLE PARACHUTE WING PROPELLED BY A DUCTED PROPELLER

FIELD OF THE INVENTION

The present invention relates to propulsion system and wing for a light aircraft such as a power parachute or para-plane. Para-planes may employ a parachute type wing and may be propelled by an air propeller.

BACKGROUND OF THE INVENTION

Prior art powered parachutes, powered hang gliders, and ultralight aircraft use conventional (free, open, or unducted) propellers which may be relatively inefficient, noisy, and unsafe. For the purposes of this applications, the term "light aircraft" is used to include powered parachutes, para-planes, powered hang gliders, ultralight aircraft, inflatable wing aircraft or the like. Although an unducted propeller may be suitable for relatively high speed aircraft (e.g., commercial aircraft or the like) an unducted propeller may lose efficiency at lower air speeds due to the effects of propeller tip vortices and the like.

Due to its inherent nature, a light airplane may operate a lower speeds (e.g., less than 30 miles per hour). According to *Aerocrafter Homebuilt Aircraft Source Book Number 1*, (Copyright 1993 BAI publishing 940 Adams St. Benicia, Calif. 94510), incorporated herein by reference, available powered parachutes have a top speed of 26 miles per hour (mph). The U.S. Federal Aviation Administration regulations have set the top speed of ultralight aircraft to 55 MPH. Thus, a parachute airplane (classified as an ultralight) or the like typically operates in the low speed regime.

The inefficiency of unducted conventional propellers may result in a need for higher powered engines, which may be heavy, expensive, and consume more fuel. In a parachute aircraft, cost and weight may be critical criteria, as a given parachute wing design may support a given design load. Increased engine sizes may thus reduce effective load capacity of a parachute airplane.

Moreover, as in most single engine aircraft designs, the effects of engine/propeller torque on the airframe may produce undesirable handling and control effects. In a conventional (e.g., rigid) aircraft, such effects may be countered with increased rudder action or trim. However, a parachute airplane may have an engine/airframe suspended from a parachute by parachute cords or the like. Thus, propeller torque may be more difficult to counteract, as the effect of the torque may be to twist the engine/airframe in relation to the parachute wing, resulting in difficulties in control and handling.

In addition to the aforementioned difficulties, an unducted propeller in a parachute aircraft may present a safety hazard to the operator or bystanders. By the nature of the design, the engine/propeller may be mounted relatively close to the operator, or as in some designs, onto the operator. The proximity of powerplant and propeller to the operator raises serious noise concerns. In addition, the operator and bystanders must exercise care to prevent injuries due to appendages being accidently placed in the path of the propeller. Moreover, due to the nature of the design of a parachute airplane, it is essential that parachute cords do not become entangled with the propeller either during take-off, flight or during landing.

A solution to the latter of these problems has been attempted by U.S. Pat. Nos. 4,657,207, 5,044,576, and 5,160,100. These patents show aircraft with a parachute wing and propeller in a circular safety enclosure. U.S. Patent Number 4,657,207 discusses a circular shroud with support arms or the like to cover the propeller and to prevent accidental engagement or entanglement with the propeller. U.S. Pat. No. 5,160,100 discloses an enclosure called a "Guard Ring" for protection. Both patents disclose using a pair of counter-rotating propellers to provide thrust while counteracting propeller torque.

These circular safety shrouds, while providing some element of safety protection, guard only against accidental contact with the propeller from the edge of the propeller disc. Contact with the propeller from the forward or rearward portions remains relatively unprotected. Screens, grills, and the like have been attempted in some applications (e.g., backpack mounted engine/propeller) to safely enclose the propeller. However, such screens, grills or the like may reduce the efficiency of the propeller.

Inada, U.S. Pat. No. 5,044,576, issued Sep. 3, 1991, shows a propeller mounted in and enclosed by a frame. The frame is used to mount the propeller, fasten a parafoil wing, and carry the pilot. A drawing of the prior art included therein shows a propeller enclosed by a cart, but does not describe the function of the enclosure surrounding the propeller. Inada is directed toward a canopy withdrawing mechanism for the parachute wing and does not address the problem of engine torque.

Means of compensating for the effects of torque reaction are addressed in Flynn U.S. Pat. No. 4,875,642. Flynn discloses an aircraft which decreases lift on one side by reducing the length from the body of the craft to the parafoil wing. However, such a technique may reduce the overall lift of the parafoil wing and may alter the handling of the para-plane. In addition, such adjustments, unless made continuously, may correct only for engine torque at a specified engine speed or thrust level. At other engine speeds, such adjustments in support and/or control cords may be insufficient or excessive.

Flynn also states "Compensation for the effect of torque is possible by the use of counter rotating propellers . . . Counter-rotating propeller arrangements are heavy and expensive." (Col. 1 line 58–59). Counter-rotating propellers (axial or twin) may be used to counteract the torque effect, however, such a technique adds additional weight to the aircraft, which, as discussed above, has a narrow design envelope with regard to total weight.

Ducted propeller aircraft and hovercraft are known in the art. For example; semi-rigid inflatable aircraft are known using ducted propellers mounted on a rotatable axes to provide thrust and lift. Hovercraft are known to use ducted propellers to provide efficient low speed thrust. A ducted propeller may be particularly efficient in the low speed regime. However, ducted propellers have generally not been applied to general aviation aircraft, ultralights, or para-planes.

One reason, as disclosed in Edgley, U.S. Pat. No. 4,544,115, issued Oct. 1, 1985 and incorporated herein by reference, may be that the flow of air from the duct over a fuselage or control and lift surfaces may reduce the efficiency of the ducted fan. (Edgley, Col. 1, lines 20–49). Edgley attempts to solve this problem by attaching the wings to the ducted propeller and or placing the ducted propeller behind the fuselage. While such a design may solve the efficiency problems noted by Edgely, the resultant design may be expensive to produce. In addition, in at least one embodiment, the tail control surfaces remain in the slipstream of the ducted propeller.

Even in the embodiment of Edgley, when the wing is mounted to the duct there still may be a slipstream effect between the duct and the wing. Air being drawn into the duct may divert airflow from over the wing, lessening the effectiveness of the wing for producing lift.

In addition to the above described difficulties in powerplant/propeller design, the parachute wing may present some difficulties to an operator. In order to achieve flight, the operator must accelerate forward to billow the parachute with air such that it assumes its parachute or airfoil shape. A prevailing wind may be helpful in this process. Upon takeoff and landing, therefore, the parachute wing may be dragged on the ground, at least momentarily, possibly incurring damage with ground obstructions. Moreover, such an arrangement requires a certain amount of space in order to take off and land without entangling the parachute in trees, shrubs and the like.

Inada, U.S. Pat. No. 5,044,576, issued Sep. 3, 1991, discussed above, does disclose a canopy withdrawing mechanism for the parachute wing upon landing. While such a system may prevent the parachute wing from being dragged on the ground, it add additional weight and complexity to the aircraft design.

Moreover, prior art parachute wing designs may present difficulties to the operator in initially inflating the wing on the ground using propeller blast, forward motion, or the like. In addition, inlet slots, openings, or the like, may be provided on a parachute wing to provide a passage for high pressure air to inflate the wing when the wing is in motion. Such slots, opening, or the like, may reduce the overall aerodynamic efficiency of the wing by increasing drag.

Thus, it remains a requirement in the art to provide a propulsion system for a parachute airplane which is lightweight, efficient, safe and provides thrust while reducing or eliminating propeller torque effects. In addition, it remains a requirement in the art to provide an aerodynamically efficient parachute airplane wing which may be readily erected and flown.

SUMMARY AND OBJECTS OF THE INVENTION

An aircraft comprises a wing for supporting the aircraft and a ducted propeller for providing forward thrust. The ducted propeller comprises a propeller for providing thrust when rotated, a power source, for rotating the propeller, and a duct for enclosing a peripheral edge of the propeller so as to substantially separate exit airflow from the propeller from air flowing around the ducted propeller.

The ducted propeller may further comprise axial stator vanes provided within the duct for diverting airflow within the duct so as to counteract torque induced by the propeller on the aircraft. The axial stator vanes may be positioned upstream or downstream of the propeller within the duct. A streamlined cabin may be positioned forward of and axial with the ducted propeller.

The wing may comprise a parafoil wing, rogallo wing or a semi-rigid airfoil. A frame may be provided for mounting the ducted propeller to a pilot.

In accordance with another embodiment of the present invention, an inflatable parafoil wing includes a flexible parafoil canopy having a substantially airfoil shape when inflated with a gas. At least one gas valve may be provided for substantially sealing the flexible parafoil canopy so as to substantially maintain pressure within the flexible parafoil canopy. A plurality of control and support lines may be coupled to the flexible canopy for supporting a load.

The flexible parafoil canopy may comprise a plurality of individually inflatable cells with a gas valve provided for each of the plurality of inflatable cells. The flexible parafoil canopy may be inflated with a non-buoyant gas or with a buoyant gas so as to provide at least partial lift to the inflatable parafoil wing. A feed tube may be provided, coupled to an internal combustion engine so as to supply exhaust gases as pressurized gas to inflate the flexible parafoil canopy. Alternately, the feed tube may be coupled to an air bleed takeoff of a ducted fan for feeding pressurized air from an airstream of the ducted fan to the flexible parafoil canopy.

It is therefor an object of the present invention to provide a para-plane or light aircraft which counteracts for effects due to engine torque.

It is a further object of the present invention to provide a para-plane or light aircraft which is lighter.

It is a further object of the present invention to provide a para-plane or light aircraft which is more fuel efficient.

It is a further object of the present invention to provide a para-plane or light aircraft which is quieter.

It is a further object of the present invention to provide a para-plane or light aircraft which reduces the instance of injury due to propeller contact.

It is a further object of the present invention to provide a para-plane or light aircraft which reduces the instance of injury due to propeller contact while limiting the aerodynamic losses usually associated with providing such protection.

It is a further object of the present invention to provide a para-plane with a parafoil design which is easier to manipulate on the ground and on takeoff.

It is a further object of the present invention to provide a para-pane with a parafoil which reduces the incidence of ground contact of the parafoil.

It is a further object of the present invention to provide a para-plane with a parafoil which may provide improved lift.

The objective of this invention is to provide a light aircraft that has significantly improved performance, which is quieter, more fuel efficient, easier to fly, and less costly to construct than prior aircraft of this type.

This invention may be applied to an unmanned aerial vehicle (UAV), a remotely piloted vehicle (RPV) aircraft, a light aircraft, or a type of light aircraft known as an Ultralight. UAV and RPV may be used for recreational, military, and commercial purposes. UAV and RPV may not have a pilot on board the aircraft. Light aircraft may be used for commercial, military, and recreational uses. Ultralights are used for recreational and sporting purposes. In addition, the present invention may be applied to model aircraft (e.g., radio controlled aircraft), toys, and the like.

BRIEF DESCRIPTIONS OF THE DRAWINGS

DETAILED DESCRIPTION OF THE INVENTION

Figure 1:
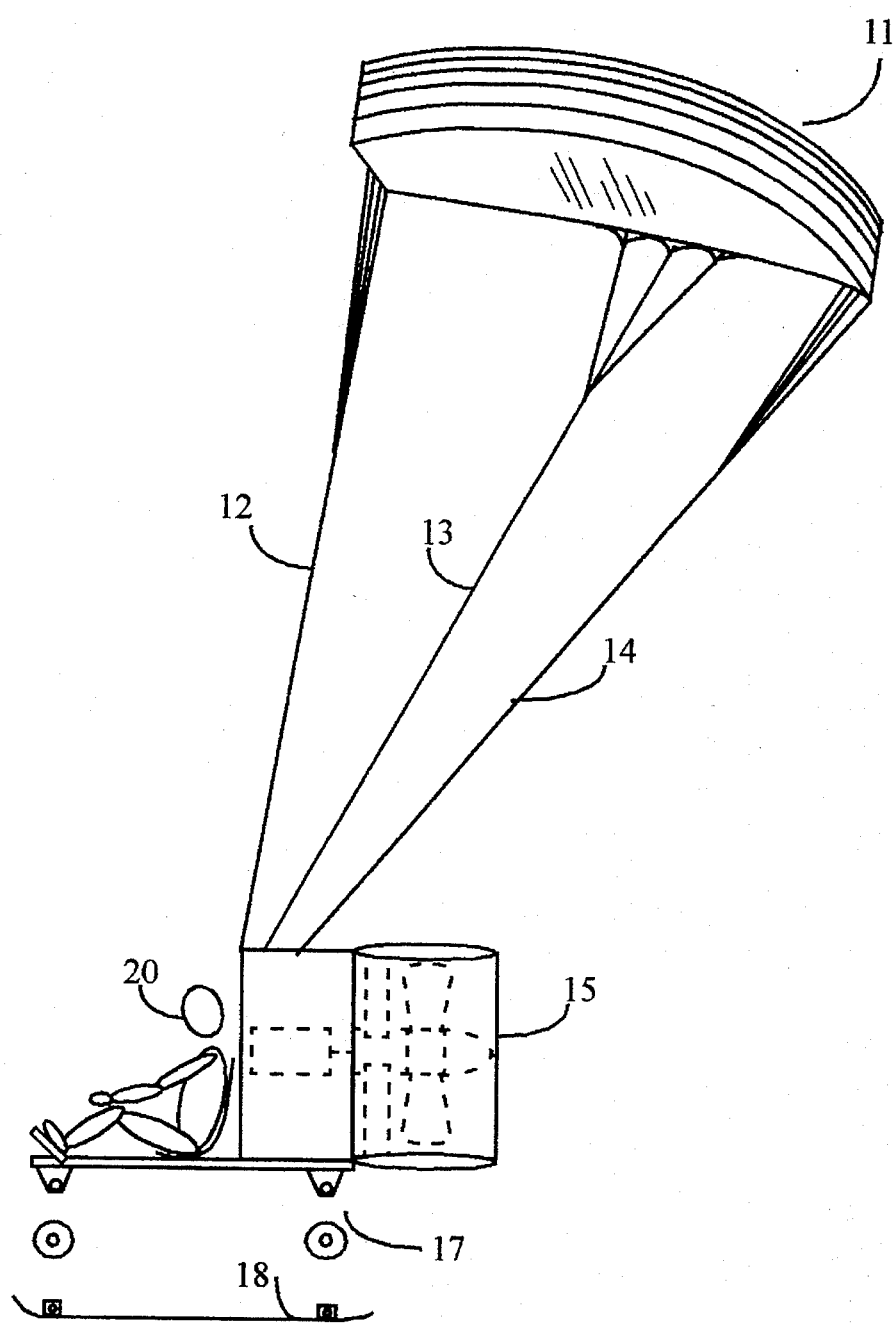
FIG. 1 is a side view of the power parachute with an open cart.

At low air speeds, ducted propellers provide a more efficient use of engine power than conventional propellers. Ducted propellers have lower tip speeds, making them quieter in operation. In addition, the duct may be used to mount stator or inlet vanes to counteract the propeller torque reaction.

The purpose for the duct around the propeller in this type of system may be to improve efficiency, increase thrust, and reduce noise. The duct also allows for placement of stators or inlet vanes to counter the effect of propeller torque reaction. A more detailed description of a duct propeller will be covered later.

The ducted propeller consists of a propeller surrounded by a duct. The duct improves the relationship between thrust generated, power input, and propeller diameter. This allows either the thrust to increase, the input power to be reduced, propeller diameter to be reduced, or any combination of the three. It does this by prevent the propeller's exit airflow from converging as it does in an open propeller. The duct separates air that flows though the propeller disk and the air the flow around it. The air that flows through the ducted propeller may expand to the exit area of the duct $(A_e)$. The exit area of the air that flows through an open propeller may contract to ½ of the area at the propeller disk $(A_r)$. The ratio of $A_e/A_r$ is called the diffusion ratio $(\sigma)$. Thus, the G may increase in the ducted propeller. The mass flow (M) may increase because it depends on Area (A) and Velocity (V), which both increase.

According to momentum theory status thrust $(T_O)$ from a propeller depends on diffusion ratio $(\sigma)$, Air Density (Rho), Mass flow (M), input Horsepower (hp), and propeller diameter (D).

The exact relations is:

$$T_0 = (\sigma X Rho x \pi)^{1/3} (55 \times M)^{2/3} (hp x D)^{2/3}$$

Where: $T_0$ is in 1 bf, Rho is in slugs/ft$^3$, M is in slugs/sec, D is in ft, Hp is in horsepower.

Since both $\sigma$ and M increase due to the duct around the propeller, the relationship between $T_0$ and Hp and D change. This allows either the $T_0$ thrust to increase, the input Horsepower to be reduced, propeller diameter to be reduced, or any combination of the three.

As the speed increases the drag from the duct increases and counteracts the gains from increased exit area.

The drag from the duct $(D_d)$ depends on the Velocity (v), Air density (Rho), the surface area of the duct (S), and the coefficient of drag $(C_d)$.

The exact relationship is:

$$D_d = \tfrac{1}{2} Rho \, V^{1/2} s \, C_d$$

$C_d$ depends on the shape of the duct along the cross sectional parallel to the air flow. Typical values of $C_d$ range from 0,008 to 0.0100, according to *Modern Propeller and Duct Design*, By Hollmann & Bettosini, Aircraft Design Inc. 1993 (MP&DD) incorporated herein by reference.

At speeds above zero the net thrust becomes $T(v) = T_0 - D_d(v) - D_p(v)$. Where: $T(v)$ = thrust at speed v, $T_0$ = Static thrust, $D_d(v)$ = Drag from duct at speed v, and $D_p(v)$ is drag from the propeller at speed v. Propeller drag $D_p$ is same as a non-ducted propeller.

According to The Design Of The Aeroplane, the ducted fans are better than open ones at speeds less than 80 Knots.

The duct propeller allows a smaller diameter propeller to provide more thrust. This has the effect of lowering the tip velocity of the propeller and reducing the level of noise the propeller generates. In addition, the duct offers a location to install sound absorbing material to reduce the amount of noise leaving the aircraft.

Stators in the form of inlet and/or exit vanes may be added to the duct to reduce the swirling of the air after it leaves the propeller. It is this swirling which may cause a propeller torque reaction. In addition, such inlet and/or exit vanes may provide additional protection to pilot or ground personnel and/or reduce the possibility of foreign objects hitting the propeller.

Craft control in the air may be accomplished by controlling the relative location of the wing and the rest of the craft, varying the angle of attack of the wing, and changing the level of thrust provided by the ducted propeller. Craft control may also be accomplished by lowering part of the back end of the parafoil, or a movable section of the parafoil. This may cause the drag on one side to increase enabling the vehicle to turn. Input controls such as steering wheels, pedals, and throttles may be used to move the lines attached to the parafoil for craft control. In addition, craft control may be obtained by angling the thrust output from the ducted propeller by use of inlet or exit vanes, or by means of a rudder provided in the slipstream of the ducted propeller.

The aircraft may be provided with a means of supporting the pilot, remote control, or flight controller in flight. A cart like that used on similar vehicles in the prior art could serve this function. A harness and fuselage like those used on similar vehicles in the prior art could be used.

By providing sufficient distance between the ducted propeller and the air lifting surfaces, the airflow over the lifting surface is not disturbed by the operation of the ducted propeller. Similarly, by removing the ducted propeller from the slipstream of the airfoil, the operation of the ducted propeller is not affected by air disturbed by the wing. Referring to the drawings, FIG. 1 illustrates an aircraft 100 constructed in accordance with the present invention. Aircraft 100 may comprise a flexible, parachute, or parafoil wing canopy 11, a load supporting flight vehicle, body, or cart 20; and ducted propeller unit 15. Cart 20 may be provided with landing gear 17, and/or skids 18, and/or floats (not shown), or the like. Support and control lines 12, 13, and 14 couple parafoil wing 11 to cart 20 and may provide an operator with means for controlling parafoil wing 11 so as to control speed, direction, and lift. Rigid connections (not shown), for example, metal rods, pylons or the like, may be provided in lieu of support and control lines 12, 13, 14.

In flight, aircraft 100 may be supported by lift provided by parafoil wing 11. Parafoil wing 11 may be constructed of parachute fabric such as Nylon, Dacron, Kevlar or the like. When in flight, parafoil wing 11 may be generally rectangular in plan view, and may have an airfoil section such that lift may be developed by forward motion. The shape of parafoil wing 11 may be sustained by the air flow. over and through parafoil wing 11 as is known in the art. A specific parachute wing design may be tailored to required performance and weight of the aircraft.

It should be noted that although FIG. 1 illustrates a parafoil type wing, other types of parachute and wings may be provided within the spirit and scope of the invention. For example, it is known in the art to use conventional type parachutes having a predetermined configuration or shape to provide lift when supplied with power (e.g., parasail or the like).

Figure 2:
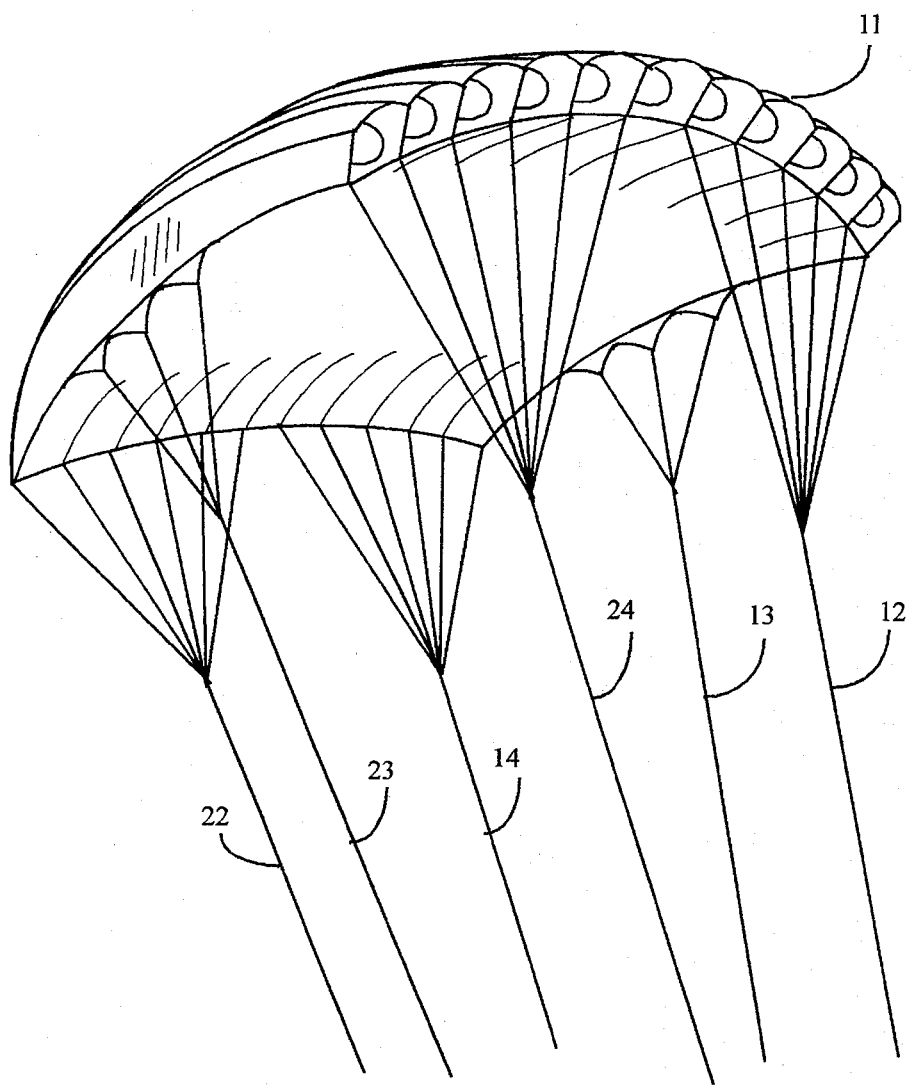
FIG. 2 is an perspective view of a Prior Art parachute wing.

FIG. 2 shows an isometric view of parafoil wing 11 in flight and more clearly illustrates to coupling of support and control lines. Parafoil wing 11 may be coupled to cart 20 of FIG. 1 by rigging, support, and control lines 12, 13, 14, 22, 23, and 24 (collectively, rigging lines 12, 13, 14, 22, 23, and 24). Rigging lines 12, 13, 14, 22, 23, and 24 may comprise cables or ropes used to carry aircraft and may typically be constructed from materials such as Dacron, Kevlar, Spectra, or the like.

Rigging lines 12, 13, 14, 22, 23, and 24 may also be used to control the speed, direction and lift of aircraft 100. The angle of attack of parafoil wing 11 may be changed with rigging lines 12, 13, 14, 22, 23, and 24. Changing the angle of attack of parafoil wing 11 may increase or decrease lift of parafoil wing 11 while in flight. Rigging lines 12, 13, 14, 22, 23, and 24 may be used to vary the distance from cart 20 of FIG. 1 to different sides of parafoil wing 11. Lowering lines 12, 13, the left side of parafoil wing 11 may reduce the distance between cart 20 and that side causing aircraft 100 of FIG. 1 to turn in that direction.

In addition, lines 14 and 22 attached to the rear of the parafoil wing 11 may be used to pull down a braking panel at the rear of parafoil wing 11 to act as a brake to slow down one or both sides of aircraft 100, providing additional way to turn the aircraft 100 or act as a speed brake.

Although FIG. 2 shows six sets of supporting and control lines, other numbers of control lines may be used within the spirit and scope of the present invention. At least two sets of control lines may be needed to provide turning controls when using parafoil wing 11.

Figure 3A:
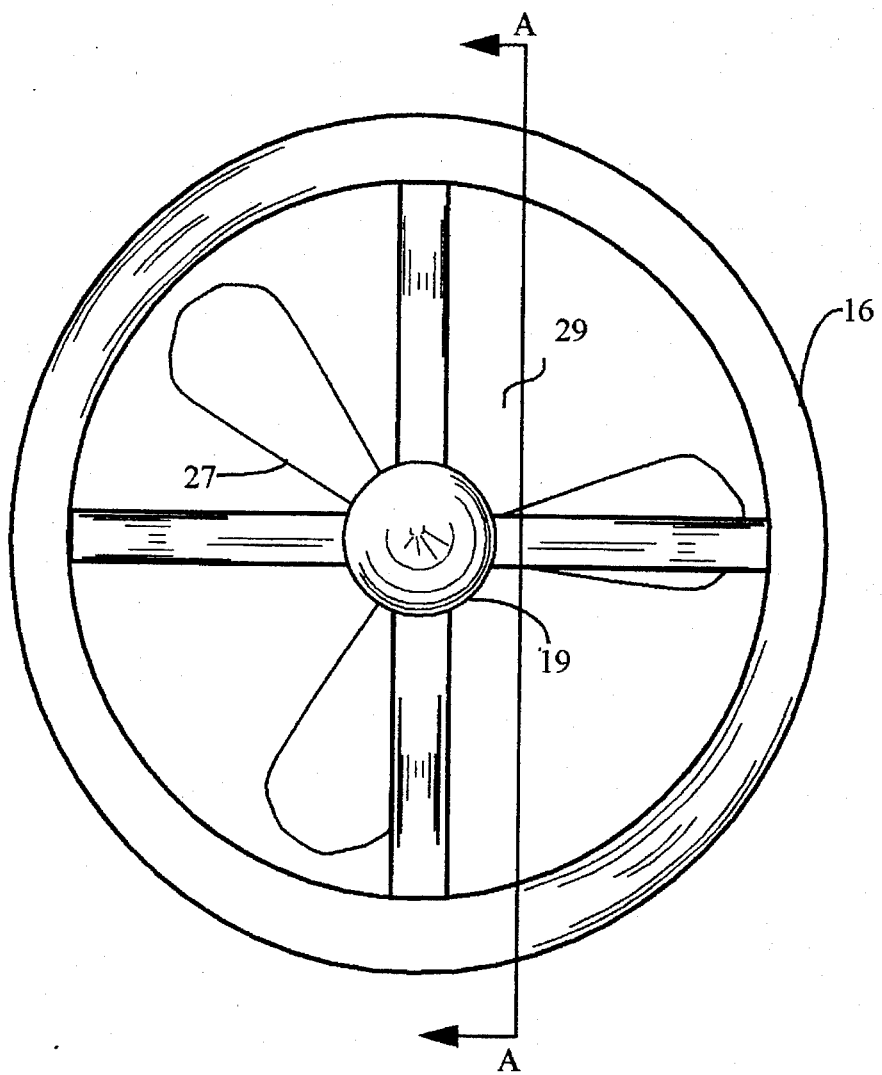
FIG. 3A is a forward view of the ducted propeller of the present invention illustrating the use of inlet stators to counteract engine and propeller torque.
Figure 3B:
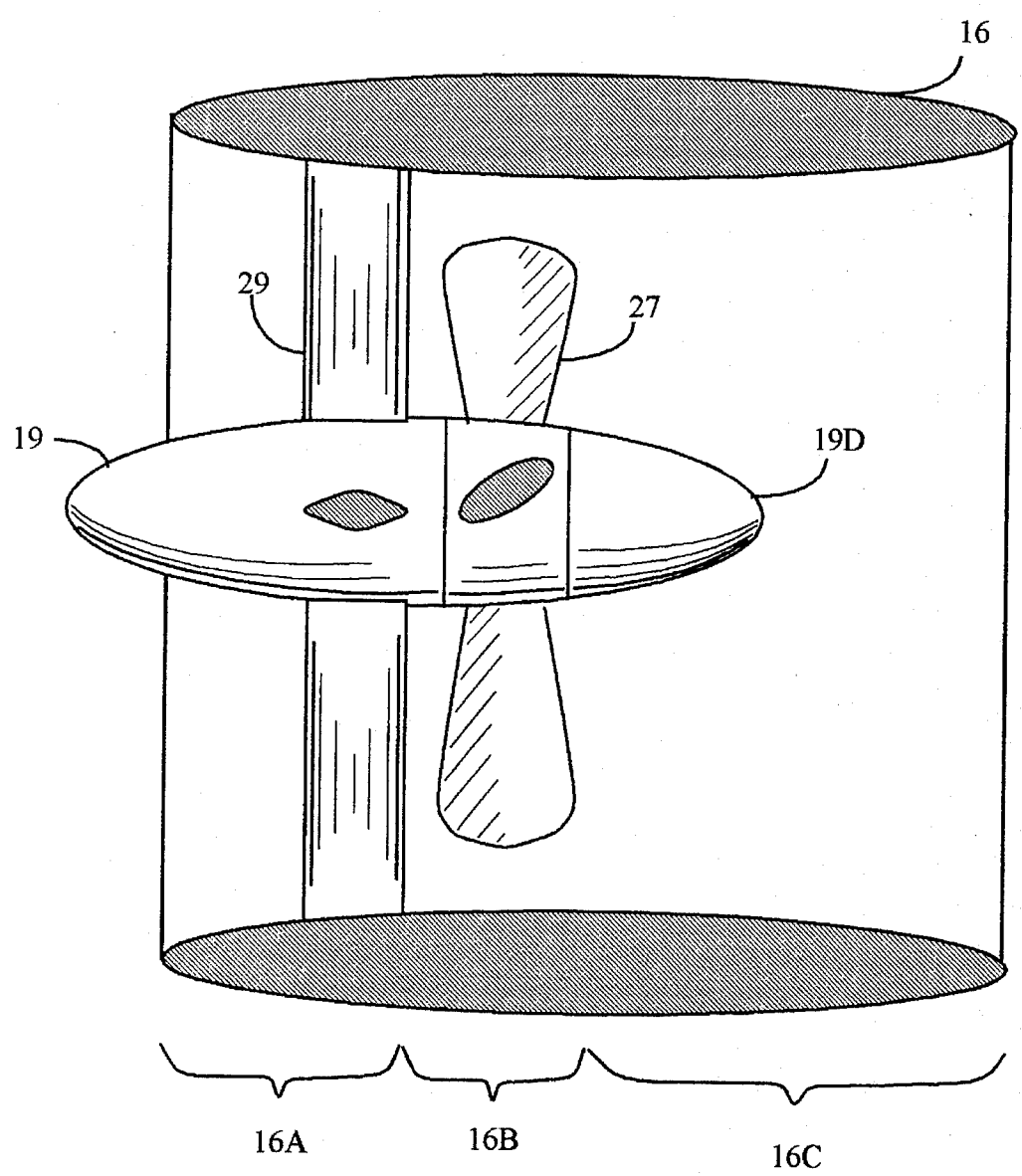
FIG. 3B is a cross-sectional view of the ducted propeller of FIG. 3A.

FIG. 3A is a forward view of ducted propeller unit 15 of the present invention illustrating the use of inlet stators to counteract engine and propeller torque. FIG. 3B is a cutaway view of ducted propeller unit 15 of FIG. 3A along line A–A'. Ducted propeller unit 15 may comprise propeller or rotor 27 carried for rotation on a hub 19 by and within duct 16 which may comprise a streamlined, quasi-airfoil constructed of aluminum, plastic, fiberglass, composite materials, tube and fabric, or the like.

The shape of duct 16 depicted in FIG. 3B comprises one embodiment, although other variations are available, depending on performance requirements such as thrust, design air speed, weight, and overall size. Duct 16 may serve to increase the mass air flow rate through propeller 27 and increase the exit area of the air flow.

Propeller 27 may comprise a standard airfoil shape designed to produce thrust. Alternately, rotors or other types of airfoil shapes (e.g., ducted fan) may be utilized. FIG. 1 shows a two blade propeller while FIG. 3B illustrates a three blade design. The number of blades may vary depending upon performance requirements as discussed above. Ducted propeller unit 15 may include a single propeller 27 as illustrated in FIGS. 3A and 3B and may also include multi propeller systems (e.g., counter-rotating propellers).

The tip of a blade of propeller 27 may be contoured to match the shape of duct 16 near where the blades of propeller 27 are located. The ducted propeller unit 15 may have larger blade area than a corresponding open propeller of equivalent thrust. According to *Modern Propeller and Duct Design* the total blade areas ($A_b$) required are:

$$A_b = 700,000 \times T_0 / (D^2 \times RPM^2) \text{ for Open Propeller and}$$

$$A_b = 2,000,000 \times T_0 / (D \times RPM^2) \text{ for Ducted Propeller.}$$

Where $T_0$ is Static Thrust, D is Propeller Diameter, RPM is rotational speed in Revolutions per Minute.

According to *The Design of the Aeroplane* (Darrole, Stinton, Oxford BSP Professional Books, 1983), also incorporated herein by reference, the duct chord may be between ⅓ to 2 times the propeller diameter.

Duct 16 may comprise three sections: an inlet lip 16a, blade containment ring 16b and exit section 16c. Inlet lip 16a may comprise the front of duct 16 where air enters. In the preferred embodiment, the inlet radius of duct 16 should be as large or larger than the diameter of propeller 27 in order to achieve the best static inlet pressure. The diameter of the inlet of duct 16 should be keep smaller at higher flight speed design ranges to reduce duct drag. *Modern Propeller and Duct Design* recommends lip radii should be 5% to 15% of duct diameter. The inside radius should be tangent to the inside diameter of duct 16 and the outside radius should be small.

Propeller containment ring 16b may comprise the middle section of duct 16 around where propeller 27 may be located. It may be configured to provide a close fit with the blade tips of propeller 27 in order to eliminate or reduce tip losses due to vortices or the like. According to *Modern Propeller and Duct Design*, the gap between the tips of propeller 27 and the inside surface of propeller containment ring 16b should be less than 0.015 inches for blades up to 18 inches in diameter and less than 0.03 for 60 inches in diameter. *Modern Propeller and Duct Design* also states that it is a common practice to locate a brush in containment ring 16b in which propeller 27 rotates. In this manner the tip losses may be minimized without added weight of a very stiff duct.

Exit section 16c of duct 16 may be behind propeller 27. For low disc loaded propellers, (e.g., less than 100 lbs/sq. ft) exit section 16c may comprise a straight duct with no taper or expansion. Low disc loaded propellers produce an insignificant pressure increase across the blade area such that it may be unnecessary to expand the exhaust flow to ambient pressure. A simple tail cone 19d aft of propeller 27 may tend to have an expansion effect and may be sufficient for most applications. Alternatively, aft section 16c may have a slight taper from front to rear to maintain constant static pressure at discharge or to increase static pressure at discharge.

Several vanes or stators 29 may be added to change rotation of the airflow to counter-act torque reactions from propeller 27. When placed upstream of propeller 27 such vanes or stators 29 may be called inlet vanes. Alternatively, vanes or stators 29 may be placed downstream of propeller 27 as exit or outlet vanes. Vanes 29 may convert rotational energy within the air flow of duct 16 to thrust energy. The size of vanes 29 may generally be kept small to minimize drag. Vanes 29 may also provide structural support to duct 16.

Inlet vanes, exit vanes or a combination of each may be used within the spirit and scope of the present invention. Vanes or stators are may not be provided if propeller torque is small or if taken care of by some other means (e.g., counter-rotating propellers). Ducted propeller unit 15 may use two counter rotating propellers as another way to counter-act propeller torque.

In addition to counteracting propeller torque, inlet and/or outlet vanes and the surrounding duct may provide an additional safety measure for pilot and ground personnel. The length of duct may be sufficient to prevent a limb (e.g., arm or the like) from entering the propeller disc. Moreover, inlet and exit vanes may further prevent accidental contact between individuals and the propellers.

While providing such additional protection from propeller contact, the duct and stators of the present invention do not reduce thrust or increase drag as in some prior art safety screen or the like. Rather, the duct and stators of the present invention may enhance the aerodynamic performance of the propeller, particularly at low speeds.

Figure 3C:
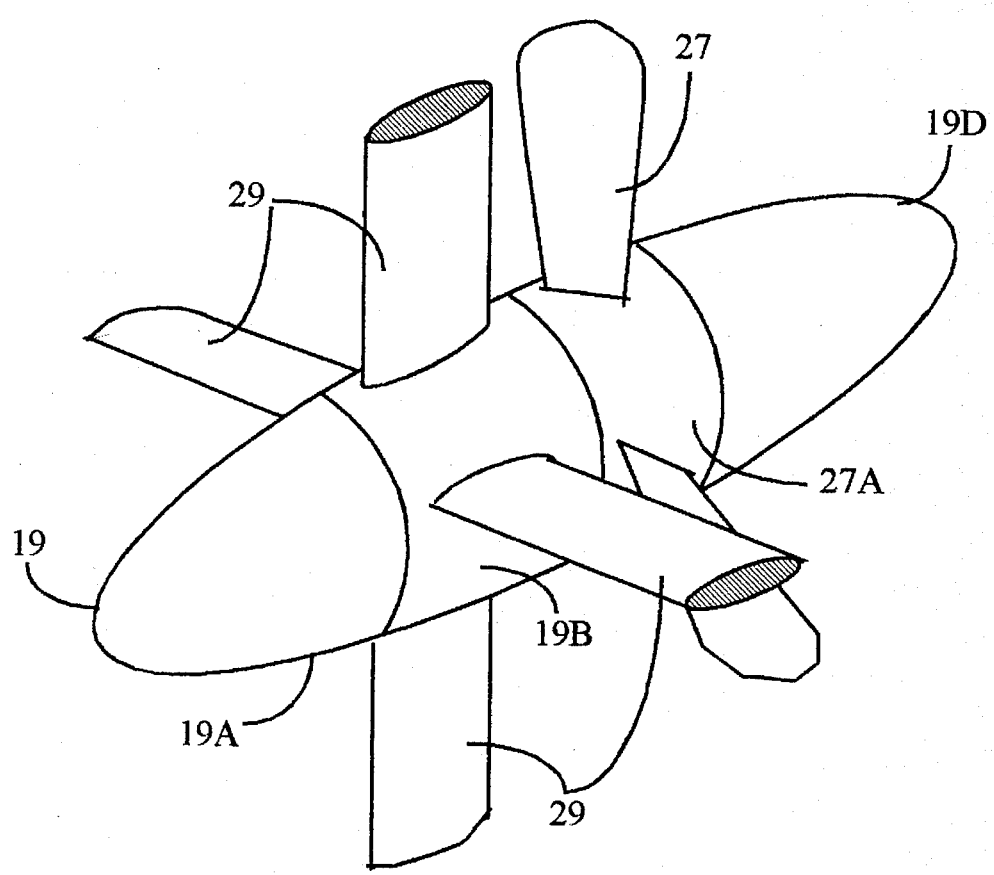
FIG. 3C is a perspective view of the ducted propeller of FIG. 3A with the duct removed.

FIG. 3C is a perspective view of propeller duct unit 15 with duct 16 removed. Hub 19 may include four portions; a nose cone 19a, stator section 19b, propeller hub 27a and tail cone 19d. The center portion of propeller 27 may comprise a rotating propeller hub 27a supporting the blades of propeller 27. A non rotating portion, stator section 19b may supports a drive shaft for propeller 27.

Power to propeller 27 may be provided from an internal combustion engine provided externally to duct 16 and fed through a driving means (shaft, belt or the like) to propeller 27. Alternatively, an internal combustion engine or the like may be provided within hub 19 to drive propeller 27. The blades of propeller 27 may be fixed or adjustable as is known in the art to provide variable pitch.

Forward of propeller 27 and inlet vanes 29 may be a nose cone 19a. Nose cone 19a may serve to reduce drag and noise of the air flow entering propeller 27. Nose cone 19a may be generally rounded and shaped like the front of a tear drop. However, ducted propeller unit 15 may be provided without such a nose cone 19a. After propeller 27 may be placed a tail cone 19d to smooth the flow of air exiting duct 16 and further reduce the drag and noise of the air flow. The diameter of hub 19 may not be critical, up to 40% of the diameter of duct 16.

Figure 3D:
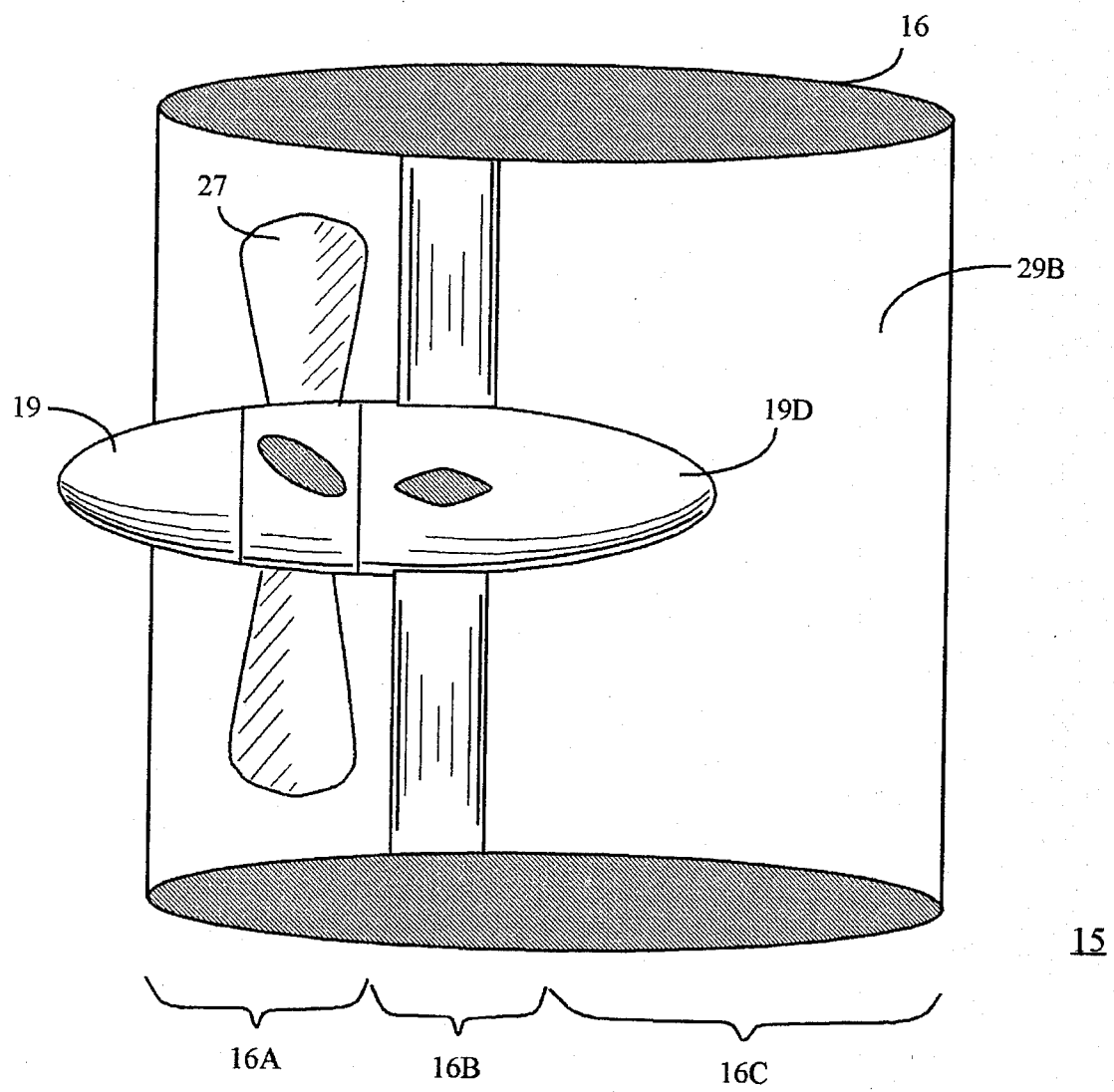
FIG. 3D is a cross-sectional view of a second embodiment of a ducted propeller showing the use of exit vanes.

FIG. 3D is a cross-sectional view of a second embodiment of a ducted propeller showing the use of exit vanes 29b in place of inlet vanes 29 of FIG. 3C. Exit vanes 29b may function in a manner similar to inlet vanes 29 of FIG. 3C to counteract propeller torque and provide structural support for duct 16.

Figure 3E:
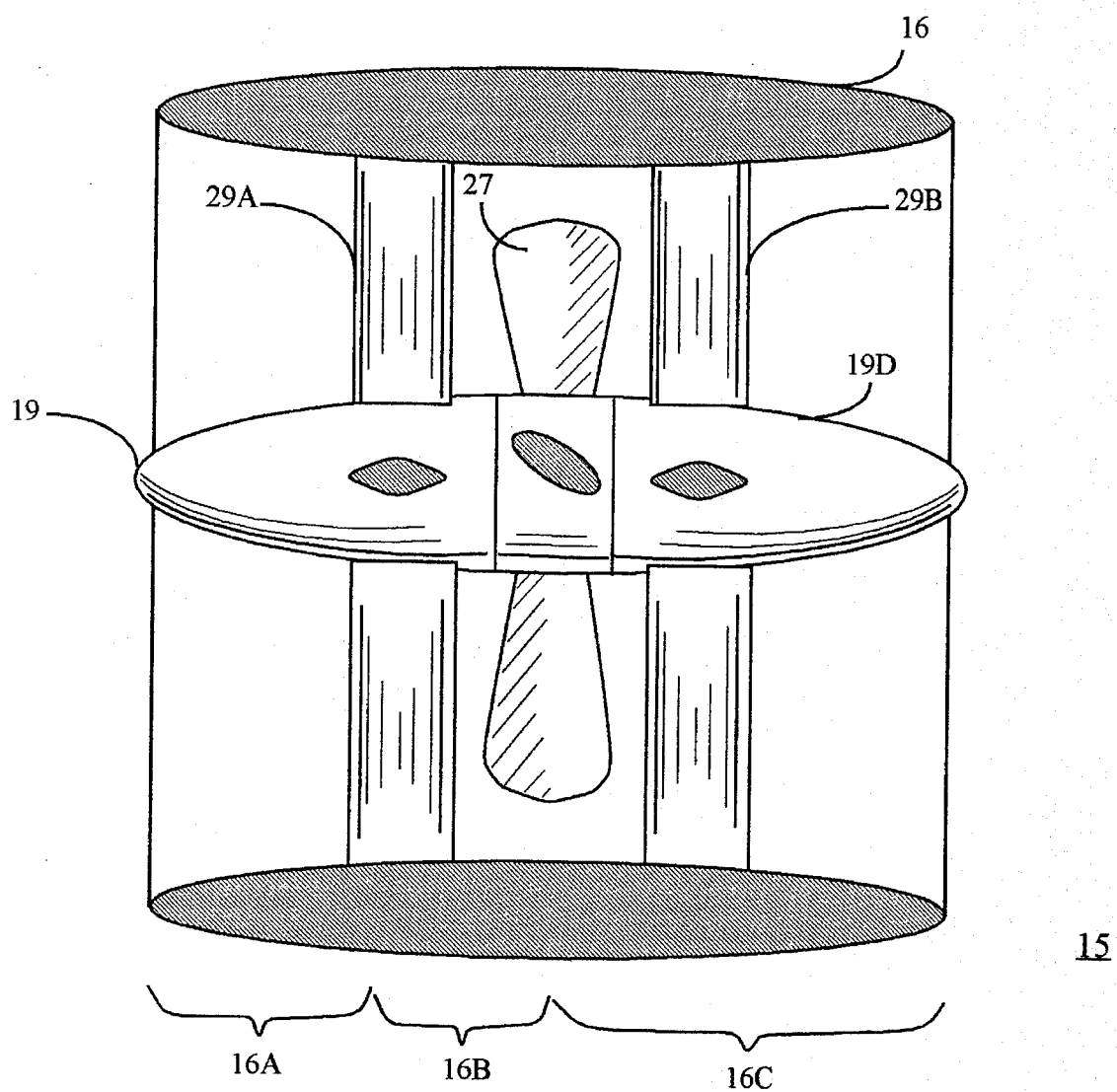
FIG. 3E is a cross-sectional view of a third embodiment of a ducted propeller showing the use of both entrance and exit vanes.

FIG. 3E is a cross-sectional view of a third embodiment of a ducted propeller showing the use of both inlet vanes 29a and exit vanes 29b.

Inlet vanes 29a and exit vanes 29b may work in conjunction with one another to counteract propeller torque. Alternately, one of inlet vanes 29a and exit vanes 29b may serve to counteract propeller torque, while the other provides structural support. Moreover, it is within the spirit and scope of the present invention to provide one or both of inlet vanes 29a and exit vanes 29b as adjustable vanes to counteract propeller torque at various thrust levels or to provide steering for the aircraft.

Figure 3F:
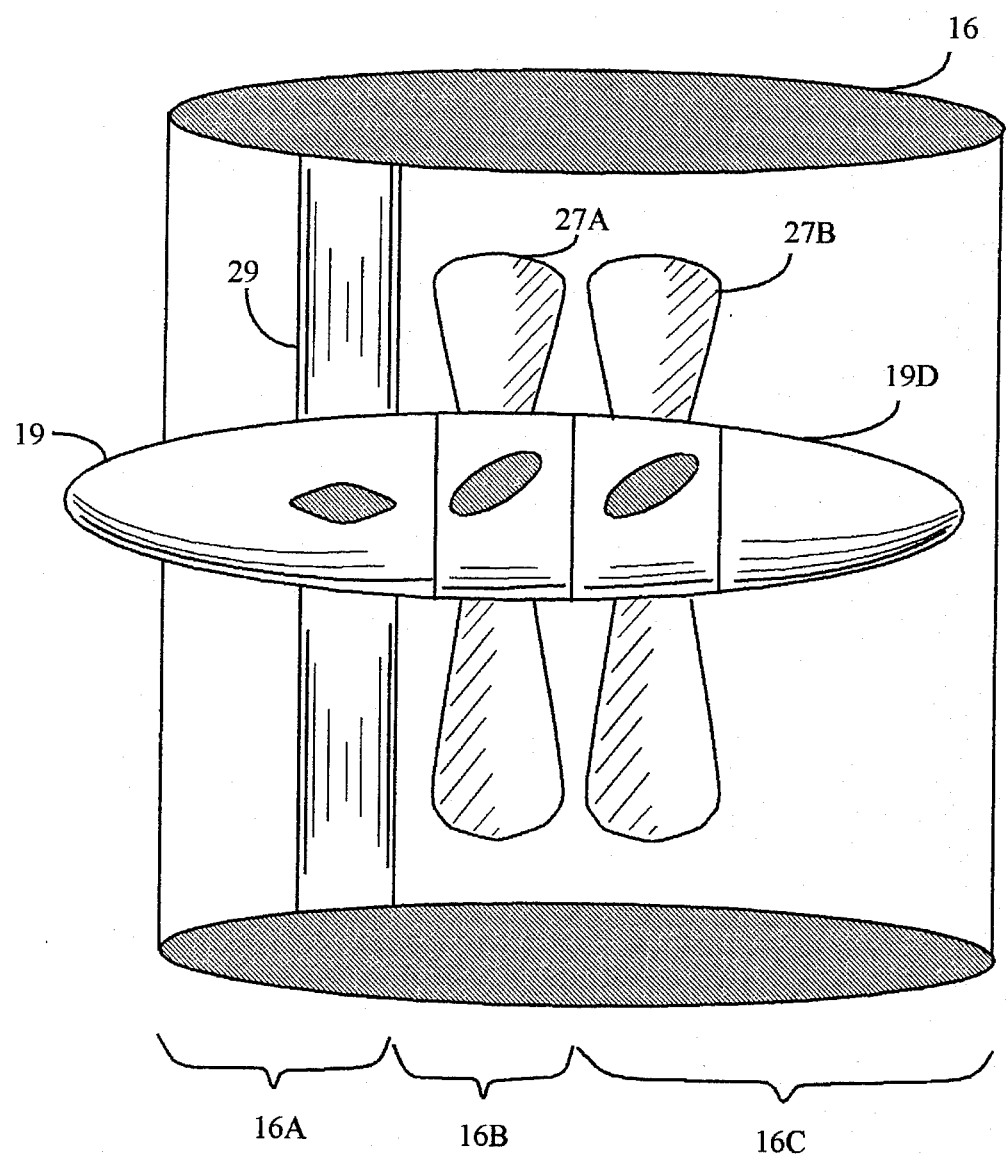
FIG. 3F is a cross-sectional view of a fourth embodiment of a ducted propeller showing the use of counter-rotating propellers.

FIG. 3F is a cross-sectional view of a fourth embodiment of a ducted propeller showing the use of counter-rotating propellers. Counter-rotating propellers 27a and 27b may each be provided to counteract the torque effect induced by the other. Counter-rotating propellers 27a and 27b may be provided with inlet vanes 29 alone, or with the combination of inlet vanes 29a and exit vanes 29b of FIG. 3E, or the exit vanes 29b of FIG. 3D.

In the embodiment of FIG. 3F, the use of inlet vanes 29a and/or exit vanes 29b may be optional. Support brackets or the like may be provided to support hub 19. Alternately, inlet vanes 29a and/or exit vanes 29b may be provided to angle thrust from counter-rotating propellers 27a and 27b to provide steering or control.

Figure 4:
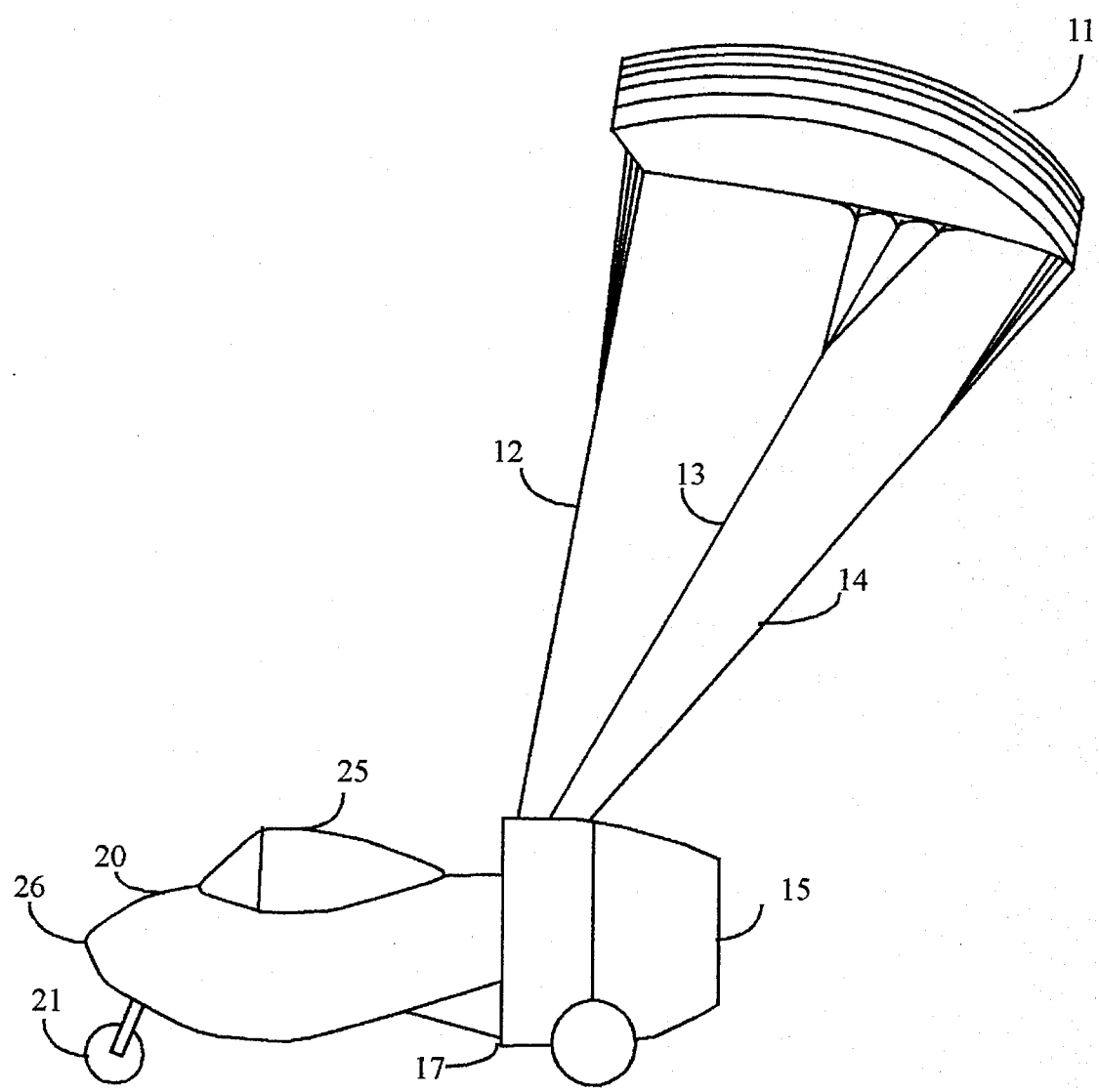
FIG. 4 is a side view of the power parachute with an enclosed cabin.

FIG. 4 illustrates an alternative embodiment para-plane 400 with a fuselage 26 in place of cart 20 of FIG. 1. Fuselage 26 may reduce aerodynamic drag on aircraft 400. Fuselage 26 may provide a place to cover the load, pilot, passenger, or equipment within aircraft 400. Fuselage 26 may be provided with main gear 17 and nose gear 21, either of which may be retractable to provide further reduction in aerodynamic forces. Fuselage 26 may be provided with a hinged canopy 25 or the like to provide ingress and egress from fuselage 26 for passengers, pilot, and cargo.

Figure 5A:
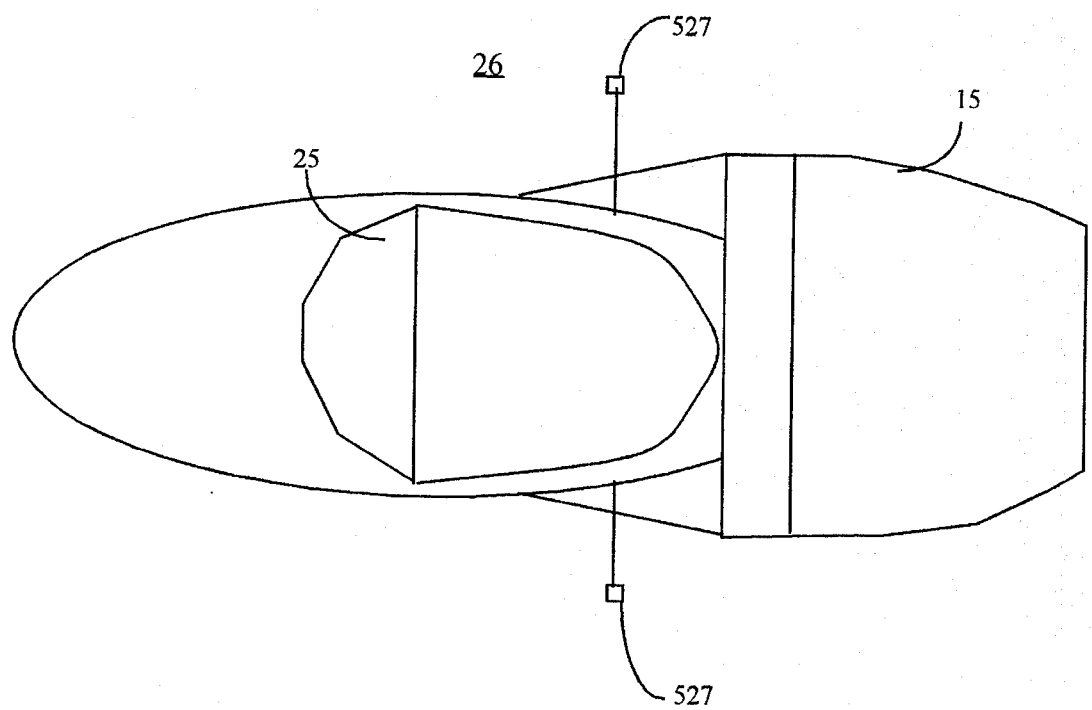
FIG. 5A is a top view of the enclosed cabin of FIG. 4.

FIG. 5A illustrates a top view of fuselage 26. Fuselage 26 may be provided coupled to the inlet of ducted propeller unit 15 so as to minimize the disruption in airflow through propeller unit 15. Alternatively, propeller unit 15 may be mounted above or to one side (e.g., if two ducted propeller units 15 are provided) to further reduce any interference with airflow into ducted propeller unit 15. Fuselage 26 may be further provided with mounting and control booms 527 on either side of fuselage 26 to provide attachment points for control and support cables for parafoil 11. Although not illustrated in FIG. 5A, additional mounting booms 527 may be provided to mount additional control or support cables as required. Such mounting booms may be coupled to a control mechanism within fuselage 26 to provide aircraft control to a pilot or control system.

Figure 5B:
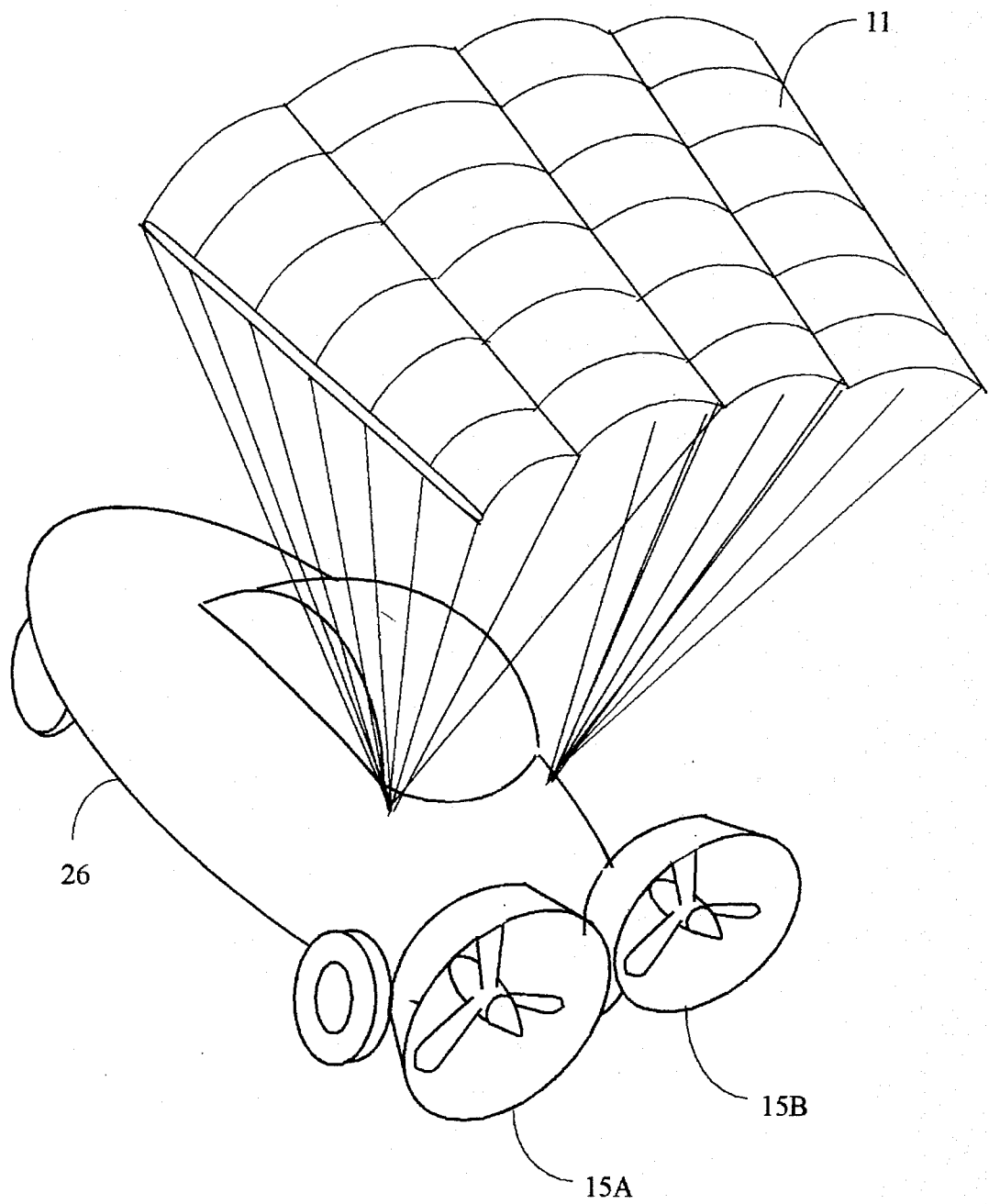
FIG. 5B is a perspective view of an alternative embodiment of the present invention showing the use of twin ducted propellers with an enclosed cabin.

FIG. 5B illustrates an alternative embodiment of the enclosed fuselage 26 of FIGS. 4 and 5A. In the embodiment of FIG. 5B, tandem ducted propeller units 15a and 15b may be provided behind fuselage 26 to provide thrust. The rotation directions of the propellers ducted propeller units 15a and 15b may rotate in opposite directions to counteract propeller torque.

Figure 5C:
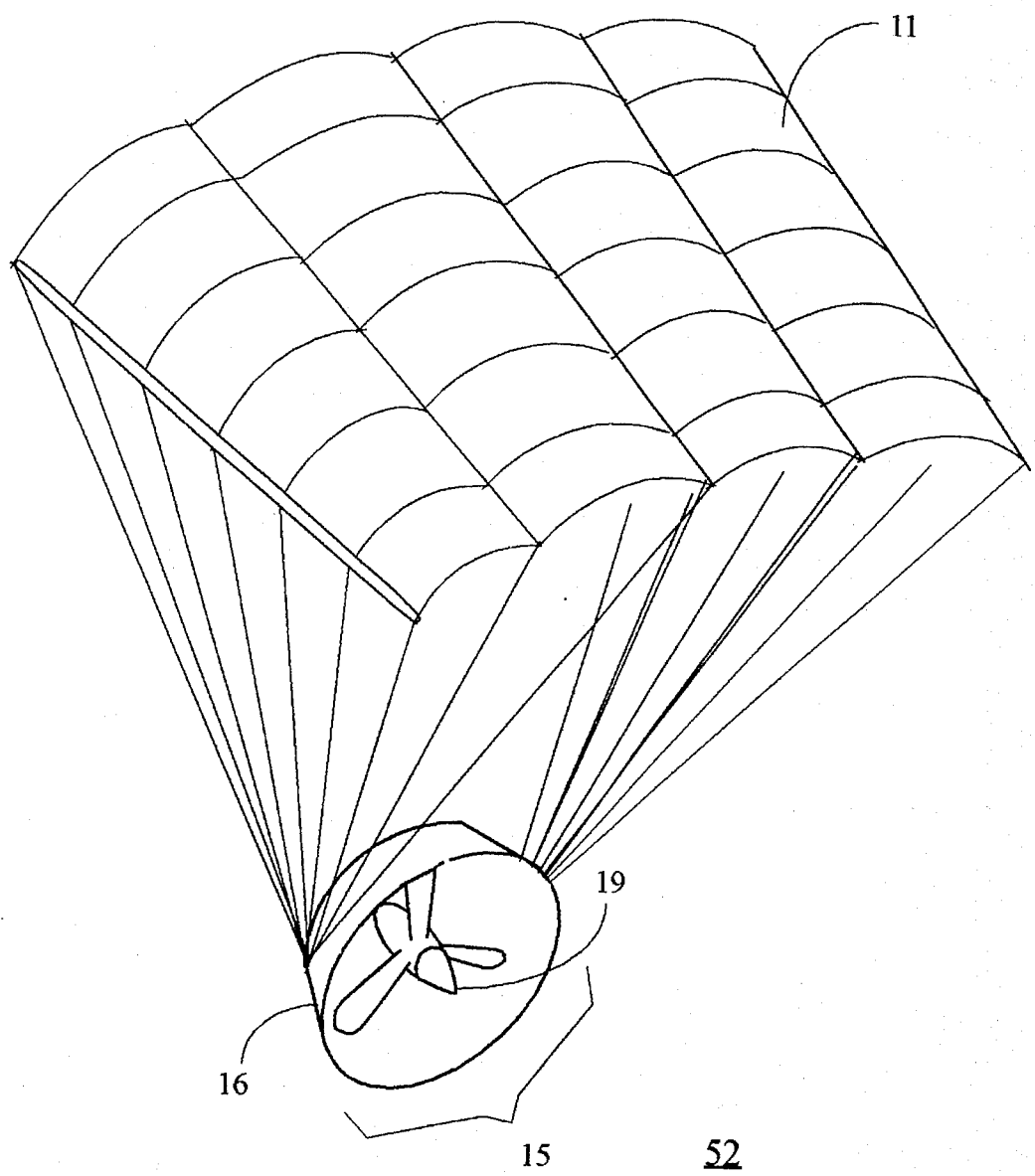
FIG. 5C is a perspective view of a flying duct embodiment of the present invention.

FIG. 5C is a perspective view of a flying duct embodiment 52 of the present invention. The embodiment of FIG. 5C may be particularly applicable to remotely piloted vehicles (RPVs) unmanned automated vehicles (UAVs) or the like. In the embodiment of FIG. 5C, fuselage 26 of FIGS. 5A and 5B may be dispensed with entirely, and the aircraft constructed of a parafoil wing 11 and ducted propeller unit 15. Suitable instrumentation, controls, sensors, or the like may be provided within duct 16 or hub 19.

The embodiment of FIG. 5C may be particularly useful for surveillance operations or the like, where a pilotless drone may be required. Flying duct 52 may be launched from a ship, mobile vehicle (e.g., HUMVEE or the like) with minimal launching equipment. Parafoil 11 may be unfurled by launching from a catapult or the like, or inflated as discussed below in the embodiments of FIGS. 8, 9, and 10. Alternately, Flying duct 52 may be launched from an aircraft in an air drop, with parafoil 11 being programmed to release at a suitable altitude or velocity with a drogue chute or the like. Alternately, flying duct 52 may be provided with landing gear, skids, floats or the like as is known in the landing gear arts, to launch and recover flying duct 52.

Once a reconnaissance mission has been completed, flying duct 52 may return to a launching point or other base, or may self-destruct. Alternately, flying duct 52 may be loaded with explosives, weaponry or the like and used to deliver such weaponry to a target.

Figure 6:
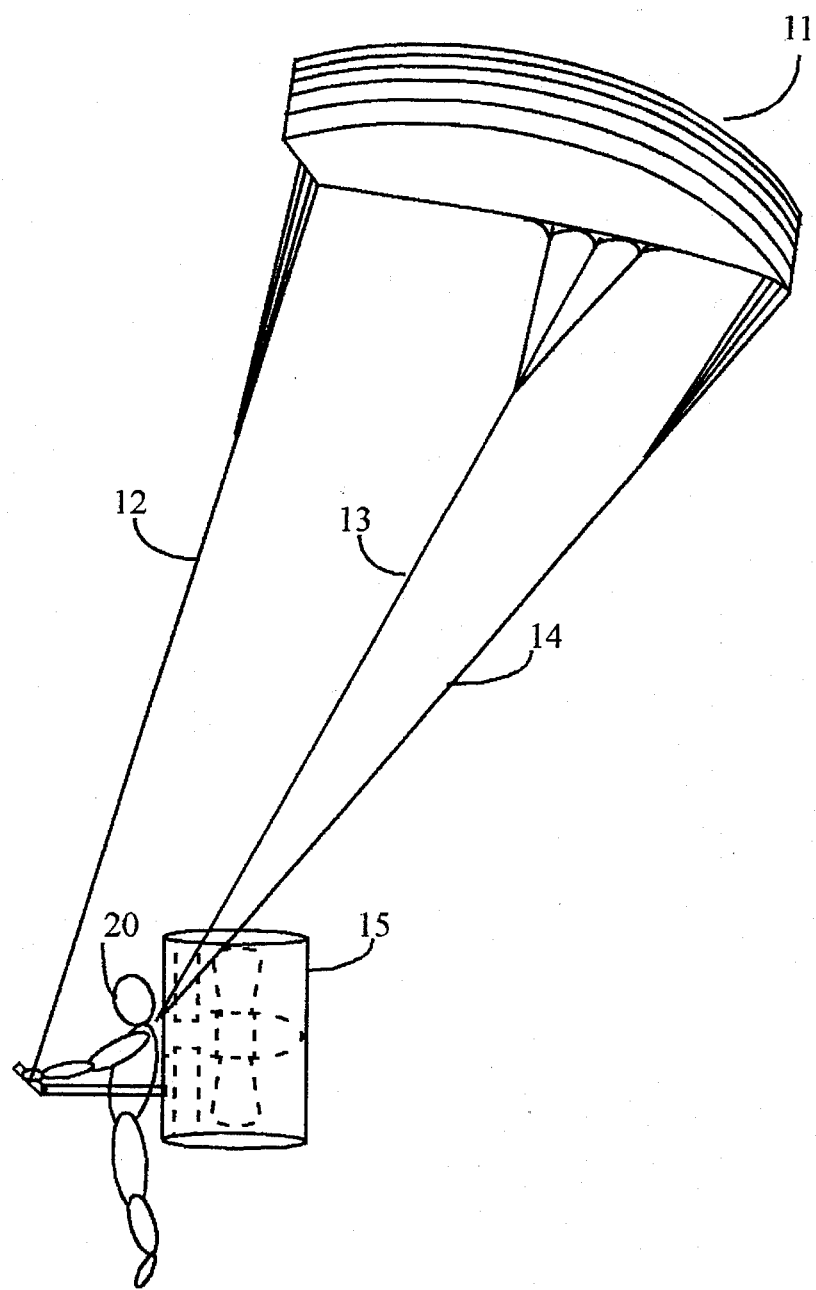
FIG. 6 is a view of the ducted propeller of the present invention as applied to backpack style powered parachute.

FIG. 6 illustrates the ducted propeller unit 15 of the present invention as applied to a backpack style powered parachute. A powered parachute may be very similar to a para-plane with the exception that in a powered parachute, the pilot may form an integral part of the fuselage. In the embodiment of FIG. 6, ducted propeller unit 15 may be mounted to the back of pilot 20 using conventional harnesses, frames or the like.

Duct 16 of ducted propeller unit 15 provides an additional safety guard for pilot 20, not only from edge strikes, but also from the front and rear of the propeller. Duct 16 may be provided long enough to prevent an extended arm from reaching the propeller. In addition, the use of vanes (inlet or outlet) as described above, may reduce the effect of propeller torque on pilot 20.

Figure 7:
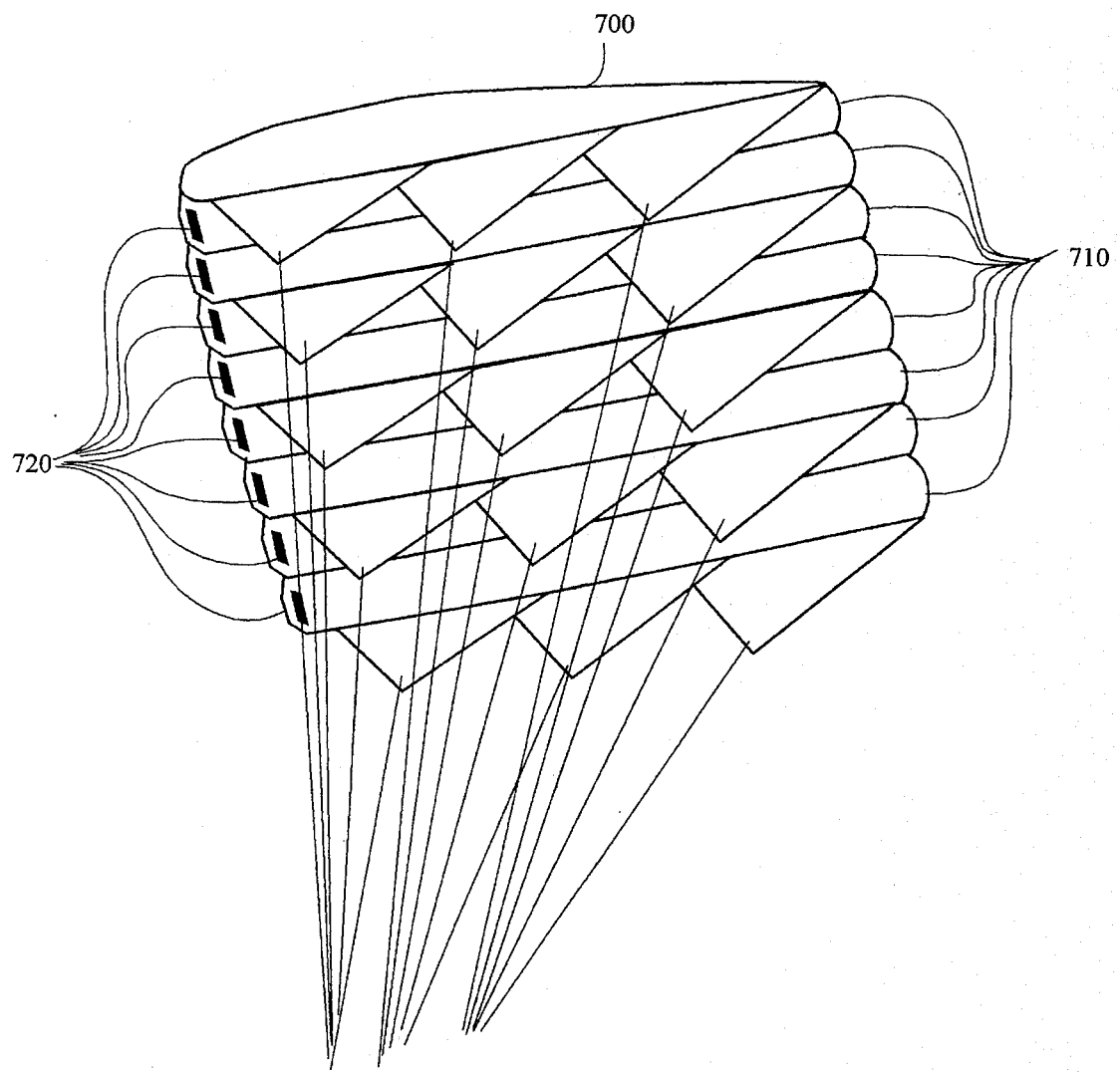
FIG. 7 is a perspective view of parachute wing incorporating inflation valves.

FIG. 7 illustrates parachute wing 700 with self-inflating valves. Such a self-inflating parachute wing is described, for example, in U.S. Pat. No. 3,749,337, issued Jul. 31, 1973 to Jalbert. Such a wing may include a number of air chambers 710 each provided with an inlet slot 720 with air valve. When the a stream of air is directed at parafoil wing 11, it billows like a conventional parachute. In addition, air entering inlet slot 720 and air valve fills air chamber 710, making parafoil wing 11 more rigid and giving it a conventional air foil shape. Inlet slot and air valve 720 may maintain pressure within parachute wing 700.

As discussed in the background of the invention, such a design may present some difficulties in landing and takeoff. In addition, parafoil wing 11 may present inherent speed range limitations, as excessive or inadequate airspeeds may result in collapse of the airfoil shape.

Figure 8:
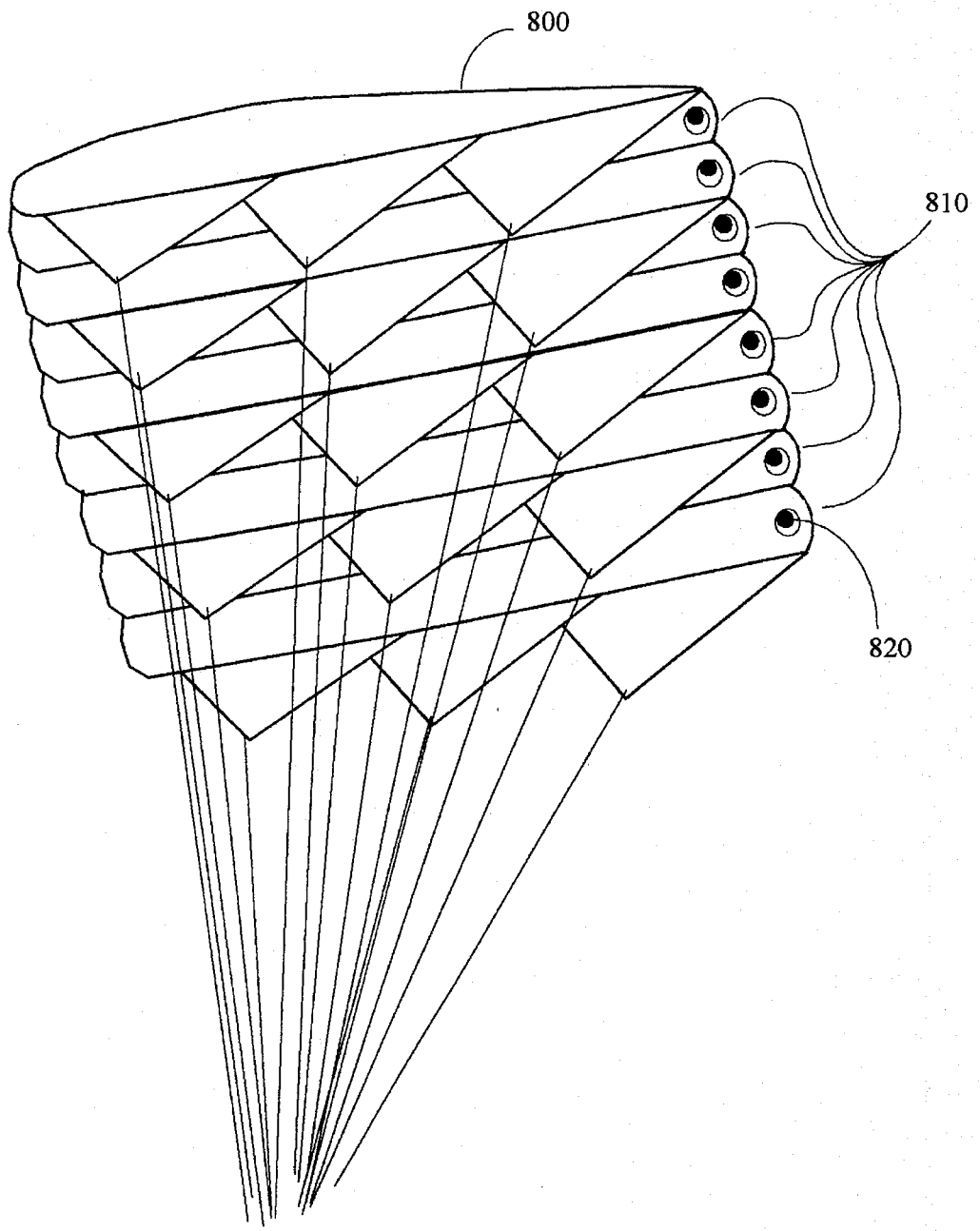
FIG. 8 is a perspective view of the inflated parachute wing of the present invention.

FIG. 8 illustrates a first embodiment of inflated wing 800 of the present invention. Wing 800 may be provided with a number of chambers 810. Chambers 810 may be individually sealed, or may be sealed as a unit, allowing for the passage of gases between the chambers. Wing 800 may be provided with a number of gas valves 820 to allow for inflation with an inflating gas. In the preferred embodiment, each chamber 810 may be separately sealed and provided with a separate inflating valve 820 as a safety measure in the event of a puncture. Wing 800 may be made of a suitable balloon material as in known in the helium and hydrogen balloon arts.

Various inflating gases may be used to inflate wing 800. The inflating gas need not be buoyant. A non-buoyant inflating gas (e.g., compressed air) may be used to inflate wing 800. Once inflated, wing 800 may be more readily manipulated and may be less likely to drag along the ground during take-offs and landings. Advantages of non-buoyant gases are reduced cost and complexity. For example, a simple compressor may be attached to the engine of the parachute airplane to inflate wing 800. Alternately, exhaust gases from the engine of the parachute airplane may be used to inflate wing 800.

Buoyant gases such as hydrogen or helium (preferably helium for its non-flammable properties) may also be used to inflate wing 800. By using a buoyant gas, wing 800 may be inflated and allowed to float free, tethered above the airframe/powerplant of the parachute airplane. By floating above the airframe/ powerplant of the parachute airplane, take-offs and landings may be effected without any ground contact of wing 800. Successive take-offs and landings may be made, for example, with pilot changes, without bringing wing 800 in contact with the ground. In contrast, in prior art parachute wing designs, each successive take off and landing may result in dragging of parafoil wing 11 on the ground, possibly resulting in dangerous tears or rips. In addition, the use of buoyant gas allows for water take-offs and landings while minimizing the risk of submerging wing 800.

In addition, the use of buoyant gases may provide additional lift for an aircraft. Wing 800 need not provide sufficient buoyancy to lift an aircraft. Rather, a limited amount of buoyancy may be provided to assist in providing lift and to reduce overall weigh of the aircraft. In one contemplated embodiment of the present invention, wing 800 may be sized such that it imparts a near neutral buoyancy to an aircraft. In such an embodiment, only a limited amount of power (e.g., thrust) may be required to provide additional lift to make the aircraft airborne. Thus, a small output powerplant may be used including human power. Such an embodiment may make human powered flight possible without the added complexity and cost of present day human powered aircraft.

Figure 9:
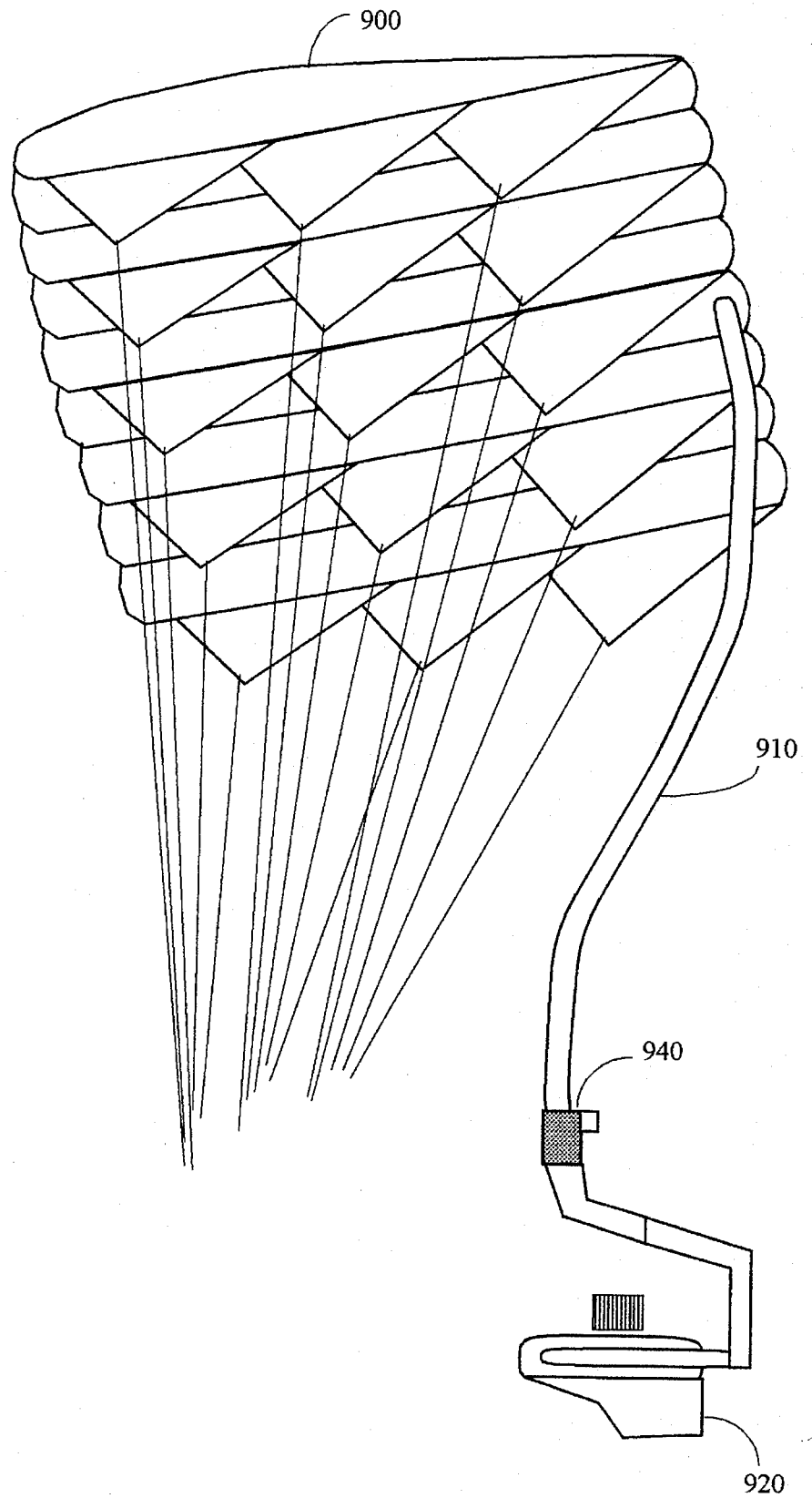
FIG. 9 is a perspective view of an alternative embodiment of the inflated parachute wing of FIG. 9.

FIG. 9 illustrates yet another embodiment of the inflatable wing of the present invention. In FIG. 9, Wing 900 may be inflated using exhaust gases from engine 920. For the purposes of illustration, the remainder of aircraft frame, propeller and the like are not shown for clarity. Wing 900 may be constructed using similar material to that used in a hot air balloon. Exhaust gases from engine 920 continually inflate wing 900 through feed tube 910.

The level of inflation of wing 900 may be controlled through manually or automatically controlled safety valves (not shown) as is known in the balloon art. The temperature of exhaust gases from engine 910 may be sufficient to float wing 900 when the aircraft is stationary on the ground. Bypass valve 940 may be provided on feed tube 910 to control the pressure within wing 900. Wing 900 may also be provided with suitable automatic or manual pressure relief valves as is known in the balloon arts.

Figure 10:
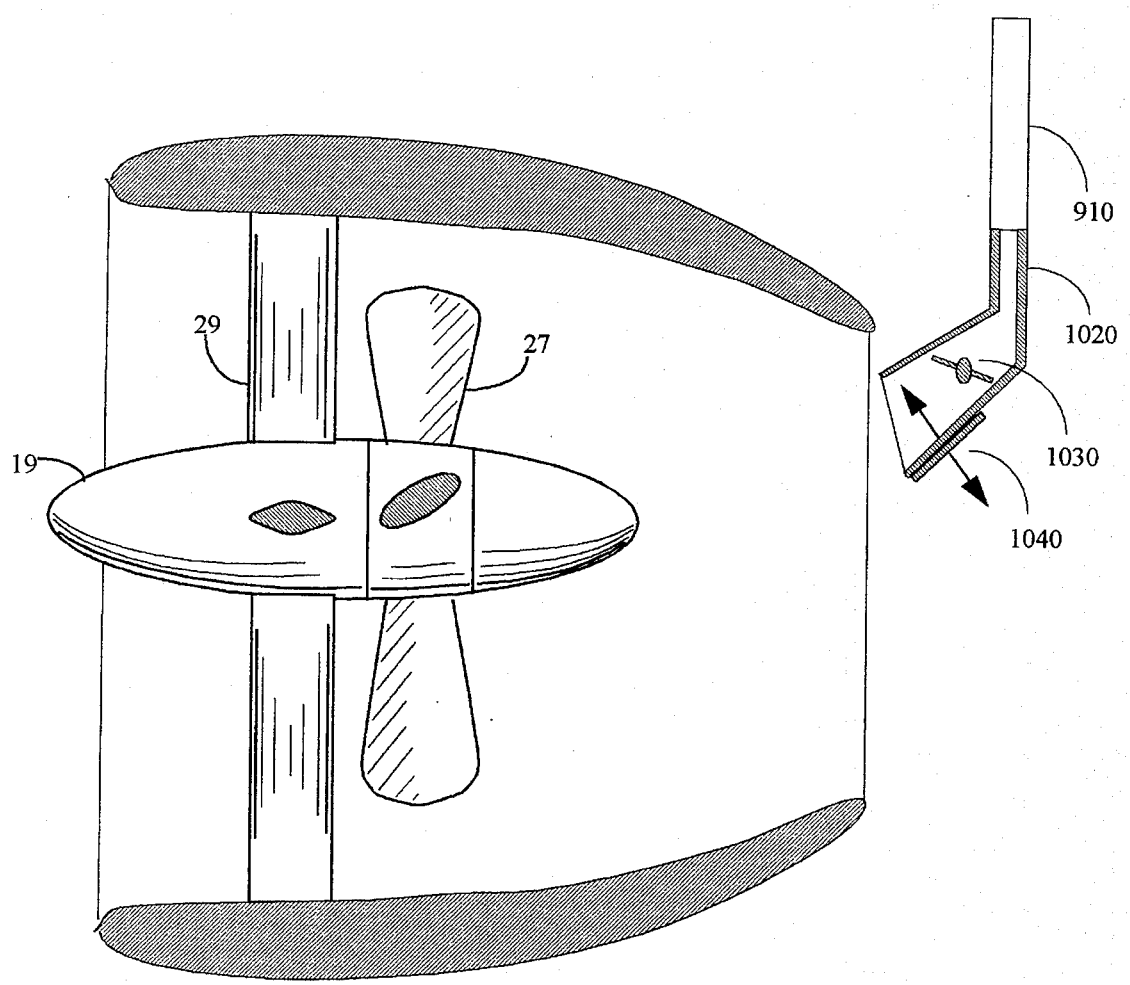
FIG. 10 illustrates an alternative embodiment for inflating the inflatable parachute wing of FIG. 9.

FIG. 10 illustrates an additional technique for inflating wing 900 of FIG. 9. In FIG. 10, a portion of the airstream through ducted propeller unit 15 is diverted through a funnel 1020 which in turn may be coupled to feed tube 910 of FIG. 9. Such techniques for diverting a portion of airflow from a ducted fan are known in the hovercraft art. Funnel 1020 may be provided with a valve mechanism 1030 to control the amount of inflation of wing 900 of FIG. 9. Alternately, or in addition, funnel 1020 may be provided with movable inlet 1040 to control the flow of air through feed tube 910.

While the preferred embodiment and various alternative embodiments of the invention have been disclosed and described in detail herein, it may be apparent to those skilled in the art that various changes in form and detail may be made therein without departing from the spirit and scope thereof.

For example, in the preferred embodiment, the present invention may be applied to para-plane having a parafoil or parachute type wing. However, the ducted fan of the present invention may also be similarly applied other types of ultralight aircraft operating in the low speed regime. Thus, for example, the ducted fan of the present invention may be applied to rogallo or semi-rigid airfoils type ultralight aircraft in order to reduce noise, increase engine efficiency and reduce weight.

What is claimed is:

1. The inflatable parafoil wing comprising:
    a flexible parafoil canopy having a substantially airfoil shape when inflated with a gas;
    at least one gas valve for substantially sealing said flexible parafoil canopy so as to substantially maintain pressure within said flexible parafoil canopy;
    a plurality of control and support lines, coupled to said flexible canopy for supporting a load;
    a feed tube, coupled to said flexible parafoil canopy for supplying a pressurizing gas; and
    an internal combustion engine, coupled to the load, said internal combustion engine having an exhaust coupled to said feed tube so as to supply exhaust gases as pressurized gas to inflate said flexible parafoil canopy.

2. The inflatable parafoil wing of claim 1 wherein said flexible parafoil canopy comprises a plurality of individually inflatable cells and said at least one gas valve comprises a plurality of gas valves, at least one of which are provided for each of said plurality of inflatable cells.

3. The inflatable parafoil wing of claim 1 wherein said flexible parafoil canopy is inflated with a non-buoyant gas.

4. The inflatable parafoil wing of claim 1 wherein said flexible parafoil canopy is inflated with a buoyant gas so as to provide at least partial lift to said inflatable parafoil wing.

5. The inflatable parafoil wing of claim 1, further comprising a fuselage frame, coupled to said parafoil wing, including a streamlined cabin positioned forward and axial with said ducted fan for mounting said ducted fan to a pilot.

6. An inflatable parafoil wing comprising:
    a flexible parafoil canopy having a substantially airfoil shape when inflated with a gas;
    at least one gas valve for substantially sealing said flexible parafoil canopy so as to substantially maintain pressure within said flexible parafoil canopy;
    a plurality control and support lines, coupled to said flexible canopy for supporting a load;
    a feed tube, coupled to said flexible parafoil canopy for supplying a pressurizing gas;
    a ducted fan, coupled to the load for providing thrust; and
    an air bleed take-off, coupled to said ducted fan and said feed tube, for feeding pressurized air from an airstream of the ducted fan to said flexible parafoil canopy.

7. The inflatable parafoil wing of claim 6 wherein said flexible parafoil canopy comprises a plurality of individually inflatable cells and said at least one gas valve comprises a plurality of gas valves, at least one of which are provided for each of said plurality of inflatable cells.

8. The inflatable parafoil wing of claim 6 wherein said flexible parafoil canopy is inflated with a non-buoyant gas.

9. The inflatable parafoil wing of claim 6 Wherein said flexible parafoil canopy is inflated with a buoyant gas so as to provide at least partial lift to said inflatable parafoil wing.

10. The inflatable parafoil wing of claim 6, further comprising a fuselage frame, coupled to said parafoil wing, including a streamlined cabin positioned forward and axial with said ducted fan for mounting said ducted fan to a pilot.

* * * * *